United States Patent [19]

Anderson, Jr. et al.

[11] 3,980,582

[45] Sept. 14, 1976

[54] METHOD AND CATALYST FOR REMOVING MERCAPTANS AND MERCAPTIDE COMPOUNDS FROM AQUEOUS ALKALINE SOLUTIONS

[75] Inventors: Gilbert P. Anderson, Jr., Ashland; Clifford Ward, Louisa, both of Ky.

[73] Assignee: Ashland Oil, Inc., Ashland, Ky.

[22] Filed: Mar. 3, 1975

[21] Appl. No.: 554,492

Related U.S. Application Data

[63] Continuation-in-part of Ser. No. 395,256, Sept. 7, 1973, Pat. No. 3,923,645.

[52] U.S. Cl............................ 252/428; 252/430; 252/431 N; 260/250 BC; 260/270 T
[51] Int. Cl.².......................................... B01J 31/18
[58] Field of Search............. 252/428, 430, 431 N

[56] References Cited
UNITED STATES PATENTS

| | | | |
|---|---|---|---|
| 2,337,232 | 12/1943 | Daly | 252/431 N X |
| 2,951,797 | 9/1960 | Sharp | 252/431 N X |
| 3,109,800 | 11/1963 | Sharp | 252/426 X |
| 3,658,721 | 4/1972 | Tamaru et al. | 252/430 X |

Primary Examiner—Patrick P. Garvin
Attorney, Agent, or Firm—Van D. Harrison, Jr.

[57] ABSTRACT

Disclosed is a catalyst and method for converting mercaptans and mercaptide compounds in aqueous alkaline solution to disulfides. Catalytic agent is metal compound of tetrapyridinoporphyrazine (TPPA) preferably impregnated on an inert granular support. Method comprises contacting mercaptans and mercaptide compounds in aqueous alkaline solution with air in the presence of the catalyst and subsequently separating alkaline solution from the resultant disulfide compounds.

16 Claims, 2 Drawing Figures

METHOD AND CATALYST FOR REMOVING MERCAPTANS AND MERCAPTIDE COMPOUNDS FROM AQUEOUS ALKALINE SOLUTIONS

CROSS REFERENCE TO RELATED APPLICATION

This application is a Continuation-in-part of our copending application Ser. No. 395,256, filed Sept. 7, 1973, now U.S. Pat. No. 3,923,645.

NATURE OF INVENTION

This invention relates to a novel method and catalyst for oxidizing to disulfides mercaptans contained in hydrocarbon distillates and mercaptan compounds present in aqueous caustic solutions used to sweeten hydrocarbon distillates.

PRIOR ART

When hydrocarbon distillates, such as gasoline, naphtha, jet fuel, kerosene, diesel fuel, or fuel oil, contain mercaptans and hydrogen sulfide, they are commonly referred to as sour and usually are unsatisfactory for their intended uses. Mercaptans have a highly offensive odor even in minor concentrations. Their presence in gasoline impairs its susceptibility to octane-improvement through adding compounds such as tetraethyl lead. When mercaptans are combusted they yield undesirable atmospheric contaminants in the form of sulfur oxides.

In present day processes, hydrogen sulfide is first removed from a sour distillate by contacting it with a selective solvent such as monoethanol amine. Subsequently, the mercaptans are removed by contacting the sour distillate with an aqueous alkaline solution (usually sodium hydroxide) thereby converting the mercaptans to water-soluble mercaptides such as sodium mercaptides. The alkaline solution, when separated from the sweetened distillate, retains the alkali mercaptide compounds and is regenerated for recycling to the sweetening process by converting the mercaptides present to disulfides. The conversion or oxidation of the mercaptides to disulfide is extremely slow. Consequently, a catalyst to increase the rate of conversion to disulfides is used. Ordinarily the disulfides formed are then removed from the alkaline solution by extraction with a suitable solvent such as naphtha. In a variation of the basic process, a mixture of distillate, aqueous alkaline solution, and catalyst is contacted with air thereby converting mercaptans present to the disulfides. Sweetened distillate is recovered from the reaction products. These basic processes are sometimes combined in a two-step mercaptan-removal process.

U.S. Pat. No. 2,966,453 discloses a process for oxidizing mercaptans to disulfides with an oxidizing agent (air) in the presence of a metal prophyrin catalyst or metal azoporphyrin catalyst. Metal prophyrins have a structure as follows where M is a metal and R is a substituent group which may be hydrogen, or an alkyl, aryl or other substituent containing up to 30 or more substituent atoms.

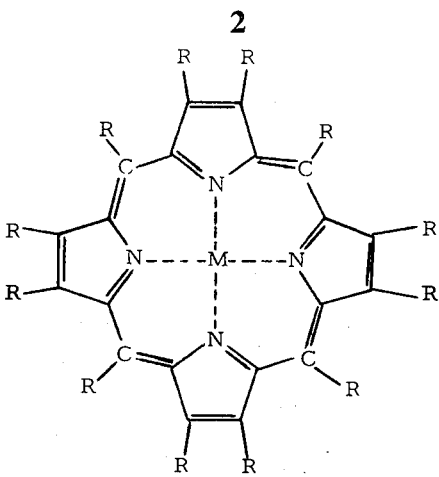

I

In the 2,966,453 patent M preferably is cobalt or vanadium, but may be selected from a number of other metals.

Metal azoporphyrins have the following structure where M is a metal.

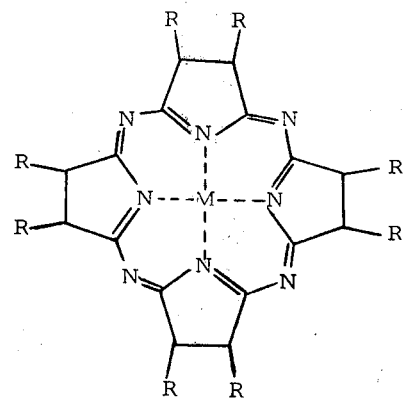

II

In the 2,966,453 patent M apparently again preferably is cobalt of vanadium, but may be selected from a number of other metals and R has the relationship stated previously. In the 2,966,453 patent, because the metal porphyrins and azoporphyrins are not readily soluble in neutral or alkaline aqueous solutions, their sulfonated or carboxylated derivative are preferred.

U.S. Pat. Nos. 2,882,224; 2,988,500; 3,108,081; 3,230,180; and 3,148,156, relate to the use of phthalocyanine compounds as a catalyst in the oxidation of mercaptans in alkaline solution. The phthalocyanine compounds have a structural formula as follows where M preferably is cobalt or vanadium.

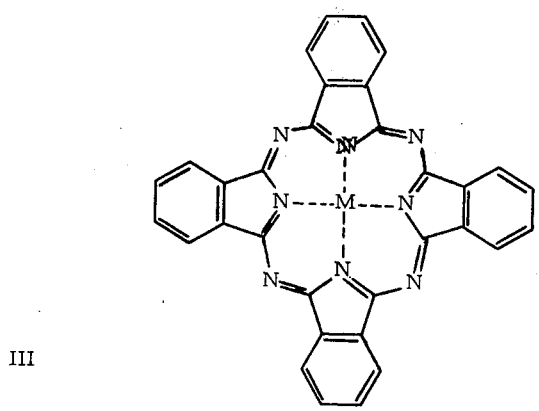

III

Again, the metal phthalocyanine is not readily soluble in aqueous solutions, so the sulfonated or carboxylated derivatives are indicated as preferred in the disclosures of these patents.

SUMMARY OF THE INVENTION

Briefly stated our invention comprises in one aspect: (a) a method for oxidizing mercaptides to disulfides by contacting said mercaptides with an oxidizing agent (preferably air) in an aqueous alkaline solution (preferably sodium hydroxide) in the presence of a catalyst comprising a metal complex or metal compound of tetrapyridinoporphyrazine, or a substituted derivative thereof, on an inert granular support; (b) in a second aspect, a method for making one form of the metal-complex catalyst, and in another aspect; (c) the catalyst product resulting by depositing the metal complex on an inert carrier, such as granular activated carbon. In still another aspect our invention comprises an improvement in the technique of preparing the tetrapyridinoporphyrazine metal compound itself wherein the reaction is conducted under pressure in excess of atmospheric.

DETAILED DESCRIPTION OF THE INVENTION

Figure 1:
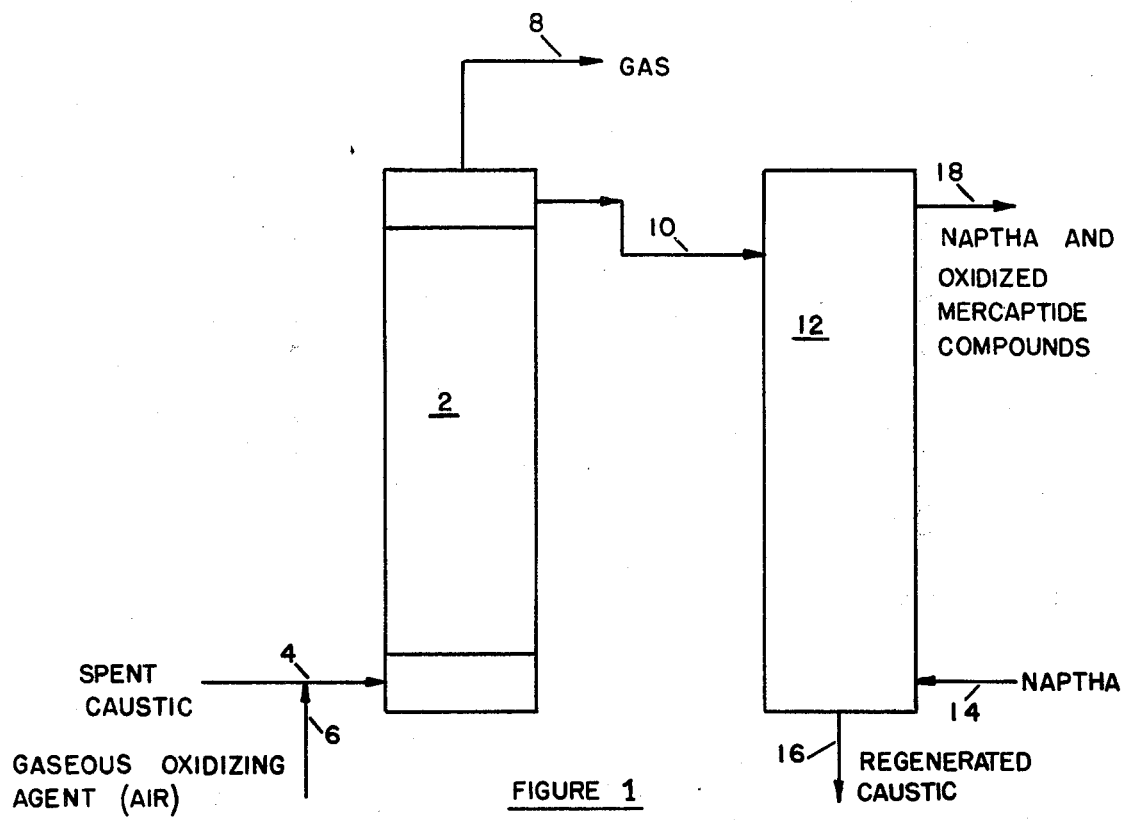
FIG. 1 is a flow sheet depicting one method of our invention wherein an alkaline solution containing alkali mercaptides is contacted with a gaseous oxidizing agent in the presence of our tetrapyridinoporphyrazine-metal-complex catalyst.

The following disclosure is divided into three parts to show: (a) a method of making the metal complex of tetrapyridinoporphyrazine; (b) a method of depositing the tetrapyridinoporphyrazine-metal complex on an inert granular carrier and the catalyst resulting thereby; and (c) the method of oxidizing the mercaptans and mercaptides in an alkaline solution to disulfides by contacting them with oxygen in the presence of a metal complex of tetrapyridinoporphyrazine, and substituted derivatives thereof, supported on a porous granular inert carrier.

The metal complexes constituting the basis of our invention are the metal complexes or metal compounds of tetrapyridinoporphyrazine and substituted derivatives thereof and have a structural formula as follows:

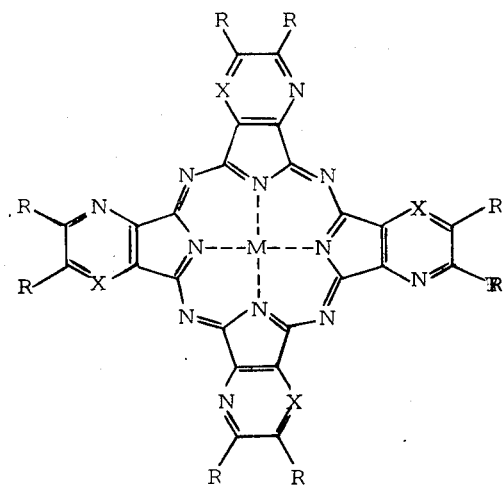

IV where M is a metal selected from the group consisting of iron, manganese, chromium, magnesium, copper, nickel, zinc, titanium, hafnium, thorium, tin, lead, columbium, tantalum, antimony, bismuth, molybdenum, palladium, platinum, silver, mercury, vanadium and cobalt. In the preceding structural formula the R group may be hydrogen or an alkyl or aryl group, or two adjacent R groups may be constituents of a cyclic or aromatic carbon structure. In the same compound the R groups may be all identical or all different. In the preceding structural formula X is a nitrogen atom or is a carbon atom having one R group attached thereto. Suitable alkyl groups for the R constituent are methyl, ethyl, propyl and iso-butyl. Suitable aryl groups include the phenyl, benzyl and naphthyl groups.

When all the R's are hydrogen, and X is a carbon atom, the unsubstituted metal-tetrapyridinoporphyrazine compound is defined.

Preferred metal compounds are vanadium- and cobalt-tetrapyridinoporphyrazine wherein the preceding structural formula M is vanadium or cobalt, the R groups are all hydrogen, and X is a carbon atom. Of these two compounds, the more preferred is cobalt-tetrapyridinoporphyrazine which thus has the following structural formula.

V

To promote clarity in the remainder of this disclosure the abbreviation TPPA is used hereinafter to abbreviate the expression tetrapyridinoporphyrazine. The preceding structural formula thus also describes cobalt-TPPA which is the preferred metal compound over vanadium TPPA.

PREPARATION OF METAL TPPA COMPOUNDS

The preparation of metal complexes of TPPA is described in the literature. In Chemical Abstracts, Volume 53, 1959, Column 21339, there is abstracted a method of preparing copper, nickel, cobalt, iron and chromium complexes of tetra-2, 3-pyridinoporphyrazine published in Nippon Kagakn Zasshi, Volume 78, pp. 1348–51, 1957. The method abstracted therein reacts quinolinic acid, and urea in the presence of boric acid and ammonium molybdate with cupric acetate, cobaltous acetate, iron powder, ferric chloride or chromic acetate to obtain the corresponding metal TPPA compound. The preparation of magnesium and copper compounds of TPPA is discussed in Journal of the Chemical society, Part I, pp. 918–920 (1937). The preparation of copper and magnesium compounds of TPPA is noted in Phthalocyanine Compounds, pp. 313–314(1963) ACS Monograph Series, Reinhold Publishing Corp., with further references indicated therein.

We have discovered that the yield of metal-TPPA compounds, particularly cobalt-TPPA, is enhanced if the reactants utilized to prepare it are reacted under pressures in excess of atmospheric pressure. The use of excess reaction pressures is not indicated in any of the literature cited above. A reaction pressure from about 50 to about 1000 psig is preferred.

Examples of our preparation of the cobalt (at a reaction pressure in excess of atmospheric) and vanadium compounds of TPPA are as follows:

EXAMPLE 1

PREPARATION OF COBALT-TPPA COMPOUND

In each of six runs, 1.25 pounds of boric acid, 1.0 pounds of ammonium molybdate, 6.0 pounds of cobaltous chloride, 16.25 pounds of quinolinic acid, 48.75 pounds of urea, and 171.0 pounds of trichlorobenzene were combined in a stainless steel reactor. The trichlorobenzene was added to serve as a medium in which to disperse the reactants. The reactor was adapted to vent reaction gas pressure in excess of 90 psig and further adapted to heat and cool the reactant materials. Over a period of four hours the reaction mixture was heated to an ultimate temperature of 430°F and gas pressure in excess of 90 psig was vented. The reaction product after being cooled to a temperature of 200° to 210°F. was removed to open containers and further cooled to room temperature. The reaction product was then centrifuged to remove liquids and the solid product obtained was pulverized in a hammer mill. The pulverized product was then slurried with hot water in a ratio of 8 pounds of product to 100 pounds of water. The slurry was then filtered and the solid residue dried at a temperature of between 150° and 200°F. This product was the desired cobalt-TPPA product. For the six runs the percent by weight of elemental cobalt in the product obtained varied from 6.7 to 8.4 with the average percent being 7.3. The average yield for three of the runs was 70.9 percent. Mechanical losses invalidated any yield calculation for the other three runs.

In similar procedures we have prepared cobalt-TPPA compound from cobaltous salts of nitric, acetic and sulfuric acids.

EXAMPLE 2

PREPARATION OF VANADIUM - TPPA Compound

To 250 ml of trichlorobenzene were added 16.7 g. of quinolinic acid, 10 g. of vanadium oxide ($V_2O_5$), 30 g. of urea, 0.5 g. of ammonium molybdate, and 1.5 g. of boric acid. The reaction mixture was refluxed under atmospheric pressure at a temperature of approximately 392°F. for two hours. The reaction mixture was then cooled to room temperature and supernatant liquid was decanted. The residue of liquid and solid was then stirred with 3.5 liters of 1 N sodium hydroxide to dissolve any vanadium oxide present. The mixture was then filtered and the solid material remaining was washed with acetone and dried. Approximately 1 gram of solid, the desired vanadium TPPA product, was recovered.

PREPARATION OF SUPPORTED METAL-TPPA CATALYST

In brief the method for preparing the supported catalyst comprises: (1) dissolving a metal complex of metal compound of tetrapyridinoporphyrazine (TPPA) or a substituted derivative thereof having the structural formula shown in Formula IV preceding in a suitable solvent; (2) adding the resultant solution to a suitable inert carrier, preferably in granular form; (3) allowing the carrier to soak in the solution at ambient temperature; (4) draining the unadsorbed solution from the carrier; (5) and washing the carrier with an alkaline or neutral solvent, preferably water.

Any inert porous material may be used as a carrier providing it is inert to alkaline solutions, has sufficient porosity and surface area to retain the metal-TPPA or derivative thereof in effective amounts, and has sufficient resistance to crushing when placed in a packed column. We prefer a granular activated carbon. As for the solvent used initially to dissolve the complex, any of the mineral acids may be used although we prefer sulfuric acid in a concentration of 50 to 96 percent by weight or more preferably sulfuric acid of 67 to 82 percent concentration. Other suitable solvents are concentrated hydrochloric acid, phosphoric acid, N,N-dimethyl formamide, N-methyl-2-pyrrolidone, and pyridine. It should be noted that the supported catalyst after the final washing need not necessarily be dried but may be put to use in a wet condition.

The amount of metal-TPPA or derivative thereof deposited on the porous carrier will vary according to its concentration in the acid solution. It is preferred to deposit as much of the metal compound as possible on the carrier. Use of sulfuric acid of 67 to 82 percent concentration as a solvent for the cobalt-TPPA complex results in optimum deposition on granular activated carbon.

A supported catalyst containing between 0.5 and 2 percent by weight of metal compound or metal complex is effective, although even lower concentrations will have beneficial effect in oxidizing mercaptides to disulfide in an aqueous alkaline solution.

The following examples are presented to demonstrate the method of preparing the supported catalyst but are not intended to limit the scope of the invention.

EXAMPLE 3

PREPARATION OF COBALT - TPPA SUPPORTED CATALYST

Cobalt-TPPA complex was prepared by reacting 25.0 grams of quinolinic acid, 55 grams of urea, 5.5 grams of anhydrous cobalt chloride, 1.5 grams of boric acid and 1.0 grams of ammonium molybdate. The reactants were combined and over a period of two hours were heated to a maximum temperature of 437°F. The reaction mixture was then cooled to 302°F. and 150 milliters of concentrated sulfuric acid were added to dissolve the reaction product. The solution of reaction product in acid was then continually cooled and diluted to a volume of 2500 ml. and allowed to stand for 16 hours. The solids present were separated by filtration, washed with acetone and dried. One gram of the product thus prepared was dissolved in 200 ml. of concentrated sulfuric acid. One hundred grams of activated carbon of 8–30 mesh size (U.S. Sieve Series) was mixed in the acid-complex solution and allowed to remain for 30 minutes. The mixture was then diluted with constant cooling to a volume of 4000 ml. The impregnated activated carbon was separated by filtration, thoroughly washed with water, and allowed to dry overnight at room temperature. Atomic adsorption analysis indicated that the impregnated activated carbon contained 587 ppm of cobalt. This is equivalent to a loading of 0.56 percent by weight of cobalt-TPPA based on the combined weights of cobalt-TPPA and granular activated carbon carrier.

EXAMPLE 4

PREPARATION OF VANADIUM - TPPA Supported Catalyst

The one-gram sample of the vanadium-TPPA compound prepared in Example 2 was dissolved in 100 ml of sulfuric acid of approximately 97 percent concentration. To this solution was added 60 grams of activated carbon of a mesh size of 8 to 30 and the mixture was allowed to sit overnight. The excess solution was then decanted and the remaining solids were washed with chilled water. The solids were then washed with acetone and dried.

OXIDATION OF MERCAPTANS

One embodiment of our invention comprises regenerating an aqueous alkaline solution containing alkali mercaptide compounds by contacting the alkaline solution with an oxidizing agent (preferably gaseous, such as air or other mixtures of oxygen and unreactive gas) in the presence of a catalyst comprising a metal compound, or complex, of tetrapyridinoporphyrazine (TPPA) or substituted derivatives thereof, impregnated on a granular solid inert carrier, preferably activated carbon. The mercaptide compounds present in the aqueous alkaline solution are thereby converted to disulfides. The disulfides are then removed from the aqueous solution by means well known to refining technology such as by extraction with naphtha. The regenerated caustic is then recycled to the hydrocarbon sweetening process where it absorbs and reacts with more mercaptans to form alkali mercaptides. After this step the spent caustic is recycled to the regenerating step just described.

In another embodiment our invention comprises mixing a hydrocarbon distillate containing mercaptans directly with aqueous alkaline solution and flowing the mixture together with an oxidizing agent (preferably gaseous, such as air, or other mixtures of oxygen and unreactive gas) through a catalyst bed comprising a metal compound or complex of tetrapyridinoporphyrazine (TPPA) or substituted derivatives thereof, impregnated on a granular solid inert carrier, preferably activated carbon. The free gas, alkaline solution and distillate are then separated. The oxidized mercaptide compounds (disulfides) remain, by reason of their solubility, in the separated distillate.

The metal compound or complex is that corresponding to structural formula IV. The metal compounds preferred are cobalt or vanadium complexes of tetrapyridinoporphyrazine, the cobalt compound being the most preferred. The aqueous alkaline solutions used in the hydrocarbon sweetening process preferably are solutions of sodium hydroxide (hereinafter referred to as caustic) and of potassium hydroxide. Other alkaline solutions which can be used include those of lithium hydroxide, rubidium hydroxide and cesium hydroxide. However, for economic reasons these last mentioned compounds generally are not preferred.

In the following description the processes described use, for purposes of illustration, aqueous sodium hydroxide (caustic) and the cobalt or vanadium compounds of tetrapyridinoporphyrazine on granular activated carbon. It is not, however, intended to limit the scope of this invention to these compounds since other aqueous alkaline solutions, other granular porous catalyst supports, other metal compounds or complexes of tetrapyridinoporphyrazine can also be used. A number of different types of hydrocarbon streams containing mercaptans can be utilized in that embodiment of our invention wherein the hydrocarbon stream containing mercaptans is mixed with regenerated caustic and flowed with oxidizing gas through a catalyst bed.

Referring now to FIG. 1, reference Numeral 2 designates a fixed-bed of catalyst (a catalytic treating zone) containing cobalt-TPPA complex impregnated on granular activated carbon. The amount of cobalt-TPPA complex on the activated carbon is between about 0.5 and 2.5 percent by weight of the total weight of catalyst. A greater concentration of the complex is, of course, not undesirable and concentrations less than 0.5 will be useful to a lesser degree. Spent aqueous caustic (sodium hydroxide) from a distillate-sweetening process (for example, a gasoline sweetening process) flows through line 4 into the bottom of catalyst bed 2. The caustic ordinarily has a concentration of sodium hydroxide of between about 5 and about 25 percent by weight and contains between about 5 and about 5000 ppm of alkali mercaptides depending upon the concentration of mercaptans in the distillate being treated and the contact time between the caustic and sour distillate. A gaseous oxidizing agent, preferably air, (although pure oxygen or oxygen diluted with nonreactive gases can be used) is introduced into line 4 from line 6, where the spent caustic and gaseous oxidizing agent mingle. Other means of mixing the spent caustic and gaseous oxidizing agent may be used prior to or at the time of admitting the two to the bottom of catalyst bed 2. The mixture of spent caustic and gaseous oxidizing agent flow upwardly through catalyst bed 2. As the caustic solution and mercaptans and mercaptide compounds contained therein progress through the catalyst bed, the mercaptide compounds react in the presence of the cobalt-TPPA catalyst with the oxygen present to form the disulfides. At the top of the bed, gas is removed through line 8 and vented from the system. The spent alkaline solution now containing oxidized mercaptide compounds (organic disulfide) and a minimum of unoxidized mercaptans is carried through line 10 to scrubber 12 where naphtha introduced through line 14 and flowing up through scrubber 12 extracts the organic disulfides present in the caustic solution. The method of scrubbing alkaline solutions with naphtha to remove oxidized mercaptans is well known to those in the art and needs no further description here. Regenerated alkaline solution is recovered through line 16 and is returned to the distillate sweetening process.

The liquid-hourly-space velocity (LHSV) of the aqueous alkaline solution flowing through catalytic zone 2 preferably is between about 0.1 and about 20 volumes of aqueous caustic per unit volume of catalyst and the ratio of moles of oxygen admitted to the system to the moles of mercaptan admitted preferably is at least 0.25 to 1, but can be as high as 1 to 1. Operating pressures and temperatures in the regeneration zone 2 are between about 10 and about 100 psig and about 50° and about 150°F. respectively.

Figure 2:
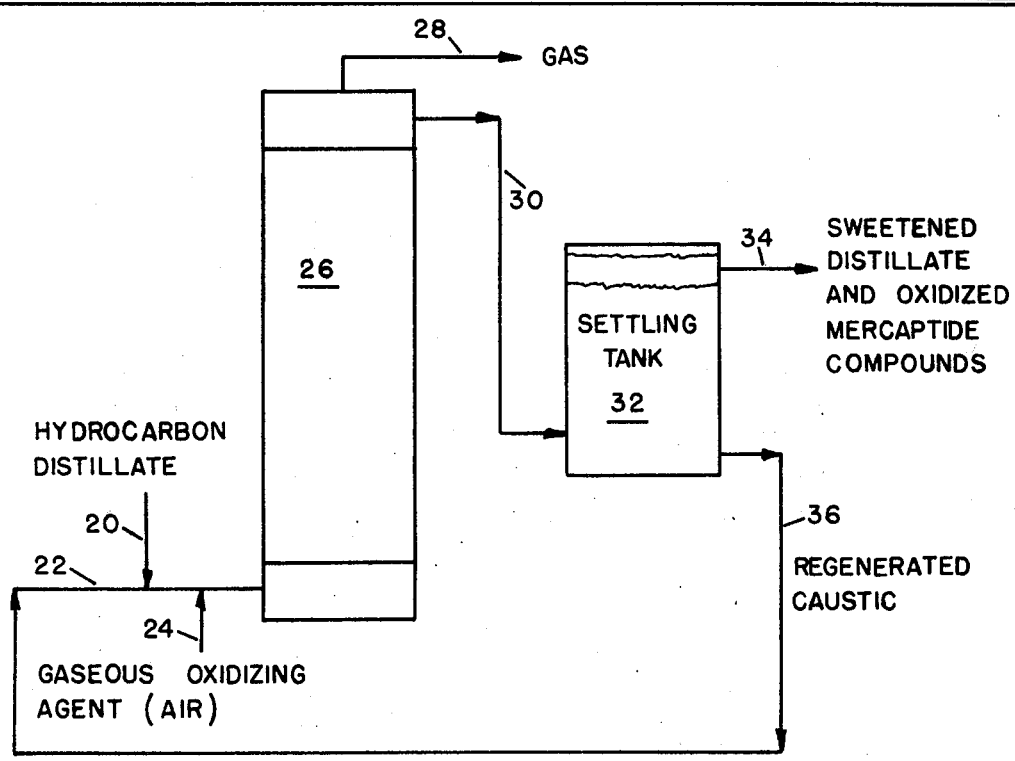
FIG. 2 is a flow sheet depicting another method of our invention wherein the hydrocarbon distillate, a gaseous oxidizing agent, and the alkaline solution simultaneously flow through a fixed bed of our metal-complex catalyst.

FIG. 2 presents schematically a second embodiment of our invention which can be used when the mercaptans present in the hydrocarbon distillate are objectionable primarily because of their odor, and when the mercaptans, if converted to the less offensive disulfide, can remain in the final distillate product. In this embodiment sour hydrocarbon distillate is introduced through line 20 into line 22 wherein regenerated alkaline solution (sodium hydroxide) is flowing. A gaseous oxidizing agent, preferably air, is introduced through line 24 so that a mixture of air, sour distillate, and aqueous alkaline solution are carried through line 22 into the bottom of fixed catalyst bed 26. Catalyst bed 26 contains cobalt-TPPA complex impregnated on an inert support, preferably granular activated carbon. The mixture of distillate, alkaline solution and air flows up through catalyst bed 26 to the top where gases present are removed through line 28. As the distillate, alkaline solution and air flow through the catalyst bed, the mercaptan compounds present in the distillate are converted to organic disulfides which are soluble in the hydrocarbon distillate and are retained therein. The mixture of aqueous alkaline solution and hydrocarbon distillate flows through line 30 into settling tank 32. In settling tank 32 the hydrocarbon distillate now sweetened but still containing the oxidized mercaptan compounds is withdrawn through line 34. The alkaline solution which separates as a separate phase is removed through line 36 and is recycled to the sweetening process. The conditions of temperature, pressure, and LHSV for this embodiment of our invention are the same as for our first embodiment described preceding.

Another method of contacting spent caustic with a gaseous oxidizing agent and the cobalt-TPPA complex impregnated on granular activated carbon is a batch process. In this variation the caustic containing mercaptides is mixed with the impregnated carbon and agitated while the gaseous oxidizing agent is bubbled through the mixture. The mixture is then filtered or decanted to remove the activated carbon and the caustic filtrate is stripped of the oxidized mercaptides by conventional methods such as liquid-liquid extraction with naphtha. The regenerated caustic is then ready for recycling to the sweetening process. This method is, however, less desirable because of the difficulties associated with batch processes in comparison to continuous processes.

The following examples are presented to demonstrate our method of regenerating spent aqueous caustic solutions containing alkali mercaptide compounds, but are presented for purposes of illustration only and are not intended to limit the scope of the invention.

EXAMPLE 5

Approximately 10 grams of activated carbon of 12 to 40 mesh size impregnated with approximately 0.15 grams of cobalt-TPPA compound was mixed with 250 ml. of 1 N sodium hydroxide and 2 ml. of n-butyl mercaptan. The mixture was continously agitated while approximately 400 cc of air per minute was bubbled through the mixture. After an interval of air blowing a sample of the reaction mixture was analyzed for mercaptide content. This procedure was repeated for 60 runs with this same reaction mixture, 2 ml. of n-butyl mercaptan being added at the start of each run. Each run lasted between 15 and 30 minutes, and the mercaptide content was calculated to vary between 2000 and 2000 parts per million parts of caustic and mercaptide at the beginning of each of the runs. Analysis of samples of the reaction mixture at the end of each run indicated the mercaptide content to be undetectable.

EXAMPLE 6

In a procedure similar to that of Example 5, 10 grams of the granular activated carbon impregnated with the vanadium-TPPA compound prepared in Example 4 was mixed with 250 ml of 1 N NaOH and 2 ml. of n-butyl mercaptan. Air at the rate of 400 cc per minute (measured at atmospheric pressure and ambient temperature) was bubbled through the mixture while it was continuously agitated, for a period of 1 ½ hours. During this period samples of the reaction mixture were removed and analyzed for mercaptide content. At the end of this first run a second run was started by adding 2 ml. of n-butyl mercaptan. The concentration of mercaptide at the beginning of each run was between 2000 and 2200 parts per million parts of caustic and mercaptide. The results obtained are reported in the following table:

| Sample No. | Mls of Sample | Time Lapse Minutes | PPM of Mercaptide Present in Sample | |
|---|---|---|---|---|
| | | | Run 1 | Run 2 |
| | | 0 | 2000–2200 | 2000–2200 |
| 1 | 1.0 | 5 | 1504 | 1920 |
| 2 | 1.0 | 10 | 1280 | 1664 |
| 3 | 1.0 | 20 | 920 | 1152 |
| 4 | 1.0 | 35 | 640 | 672 |
| 5 | 2.0 | 60 | 480 | 47 |
| 6 | 2.0 | 75 | 80 | *0 |

*After 65 minutes

EXAMPLE 7

A pilot plant test was designed so that it could make use of a portion of the aqueous spent-caustic stream resulting from a conventional refinery gasoline sweetening process. This spent caustic stream contained mercaptide compounds in a concentration varying from day to day. A portion of this mainstream of spent caustic was diverted by means of appropriate valves and piping into a "slip stream" which, with a stream of air, was continuously introduced into the bottom of a columnar fixed bed of cobalt-TPPA compound impregnated on granular activated carbon. The air and spent caustic mingled and flowed through the catalyst bed to the top where free gas was vented. Samples of the spent caustic solution flowing to the bottom of the column and from the top of the column were taken at daily intervals and analyzed for mercaptide content. The flow of aqueous caustic (the slip stream) was returned from the top of the column to the refinery mainstream of caustic for subsequent removal of oxidized mercaptide compounds and recycling to the gasoline sweetening process. Data on the test equipment is as follows:

| | |
|---|---|
| Concentration of caustic | 5–10° Baume |
| Rate of flow of spent caustic to catalyst bed: | 3 gallons per minute |
| Rate of air injection into catalyst bed: | 0.2 SCF per minute |
| Weight of catalyst in column: | 121.4 pounds |
| Composition of catalyst: | 1.57 percent by weight of cobalt-TPPA on activated carbon, 8–30 mesh size |

-continued

| Liquid Hourly Space Velocity | Approximately 7 volumes of caustic per volume of catalyst per hour |

This pilot plant test was conducted over a period of 200 days with varying concentrations of mercaptides present in the spent caustic solution, including occasional upsets when hydrogen sulfide was inadvertently introduced into the caustic treating solutions. The system did however, recover rapidly from these upsets. Typical data obtained during the 200 day run is presented in the following table.

PARTS OF MERCAPTIDE AND/OR $H_2S$ PER MILLION PARTS OF CAUSTIC PLUS MERCAPTIDE AND/OR $H_2S$*

| Day | In Flow Stream of Caustic to Catalyst Bed | | In Flow Stream of Caustic From Catalyst Bed | |
|---|---|---|---|---|
| | Mercaptide | $H_2S$ | Mercaptide | $H_2S$ |
| 45 | 976 | 176 | 736 | 104 |
| 48 | 225 | | 96 | |
| 50 | 384 | | 144 | |
| 51 | 416 | | 208 | |
| 55 | 752 | | 488 | |
| 56 | 1120 | | 800 | |
| 57 | 1216 | | 768 | |
| 58 | 1792 | 64 | 1328 | (not measured) |
| 59 | 1936 | | 1616 | |
| 69 | 1472 | | 1088 | |
| 73 | 592 | | 256 | |
| 80 | 256 | | 53 | |
| 86 | 107 | | 7 | |
| 91 | 150 | | 27 | |
| 92 | 352 | | 37 | |
| 146 | 672 | 448 | 448 | 192 |
| 147 | 560 | 72 | 275 | 5.6 |
| 148 | 120 | | 23 | |
| 149** | 64 | | 38 | |
| 153 | 176 | | 16 | |
| 154 | 464 | | 48 | |
| 156 | 1008 | | 600 | |
| 197 | 704 | | 118 | |
| 212 | 1260 | | 512 | |
| 213 | 1792 | 512 | 1600 | 256 |
| 230 | 1504 | | 1168 | |

*Entries showing PPM of $H_2S$ indicate $H_2S$ had been inadvertently admitted to spent caustic solution before entering catalyst bed. Where no PPM of $H_2S$ is shown $H_2S$ had been adsorbed by caustic.
**Fresh caustic added to mainstream supply of caustic for entire plant sweetening process.

At the conclusion of the above run 20,600 barrels of caustic had passed through the catalyst bed. The amount of cobalt-TPPA used in treating this volume was 1.9 pounds impregnated on the activated carbon carrier. This catalyst was still active at the termination of the pilot plant run.

The data in the table further shows that if the accidental contamination of the caustic solution with $H_2S$ occurs, the catalyst readily recovers from such $H_2S$ inclusion. At days 48, 59, and 148 the catalyst is recovering from $H_2S$ inclusions on days 45, 58, 146, and 147. Even on these latter days the catalyst is capable of oxidizing substantial quantities of mercaptides present to the disulfides.

Although no examples are presented showing the use of a catalyst which is a mixture of the cobalt and vanadium TPPA compounds impregnated on activated carbon, it is readily apparent that such a mixed catalyst can be used. In the preceding examples describing preparations of the cobalt and vanadium TPPA compounds and their impregnation on activated carbon, unless specified otherwise, dilutions and washings were performed with water and the acids used were aqueous solutions.

EXAMPLE 8

A completely unexpected improvement shown by the catalyst compositions described and claimed herein is the resistance to leaching of the TPPA complex when supported on a carrier and contacted with aqueous caustic. In a laboratory test, the resistance of the TPPA catalyst and the prior art catalyst to leaching over a period of time at varied liquid hourly space velocities were compared as follows:

A composite of cobalt phthalocyanine sulfonate on activated carbon was prepared in the manner described in U.S. Pat. No. 2,988,500 by dissolving 3 grams of cobalt phthalocyanine sulfonate (available commercially under the tradename Merox from the Universal Oil Products Company, Des Plaines, Illinois) in the 500 cc of water to which 30 cc of a 28 percent aqueous solution of ammonium hydroxide was added. An additional 2000 cc of water was then added thereto and the mixture was stirred. Three-hundred (300) grams of 8 × 30 mesh activated carbon was added to the mixture which was then stirred slightly and allowed to sit overnight. The excess solution was decanted and the solids were further separated by filtering off the remaining excess solution. The solids were then washed with water several times and dried.

Two fixed beds of solid catalyst were set up in the laboratory, each bed having an approximate volume of 346 cc's. The catalyst prepared as described above and designated hereinafter as prior art catalyst was placed in the left hand column. In the right hand column, there was placed an equal volume of activated carbon impregnated with colbalt tetrapyridinoporphyrazine hereinafter designated as the cobalt-TPPA catalyst. From a common supply tank an aqueous solution of 1-normal sodium hydroxide containing from 400 to 600 ppm of 1-butane thiol was flowed up through each column, the liquid hourly space velocity being the same in each column at the same point in time. The LHSV was varied during the test from 0.87 to 3.17 as shown in the following tabulation of data. Air was also introduced into each flow stream prior to passage through a column, the rates of air injection being the same for each column. Samples of the effluent from each column were then analyzed for mercaptan (1-butane thiol) content by potentiometric titration, and for the presence of cobalt phthalocyanine and cobalt tetrapyridinoprophyrazine by ultra violet spectroscopy. The total effluent from each column was accumulated. The data obtained is presented in the following table. The effluent from the prior art catalyst-packed column had a marked coloration indicating leaching of the catalyst whereas the effluent from the column packed with TPPA catalyst remained clear.

| DAY | EFFLUENT MLS | TOTAL MLS | TEST DURATION, MINUTES | LHSV | RSH IN CHARGE | PRIOR ART CATALYST EFFLUENT 2 | | CO-TPPA-EFFLUENT 3 | |
|---|---|---|---|---|---|---|---|---|---|
| | | | | | | RSH PPM | CO—PCN + — | RSH PPM | CO—TPPA + — |
| 1 | 1000 | 1000 | 200 | 0.87 | 391 | 0 | + — | 0 | — |

-continued

| | EFFLUENT | | TEST | | | PRIOR ART CATALYST EFFLUENT 2 | | | CO-TPPA-EFFLUENT 3 | |
|---|---|---|---|---|---|---|---|---|---|---|
| DAY | MLS | TOTAL MLS | DURATION, MINUTES | LHSV | RSH IN CHARGE | RSH PPM | CO—PCN + | — | RSH PPM | CO—TPPA + — |
| 2 | 1250 | 2250 | 250 | 0.87 | 405 | 0 | + | | 0 | — |
| 2 | 1000 | 3250 | 200 | 0.87 | 405 | 0 | + | | 0 | — |
| 3 | 1500 | 4750 | 300 | 0.87 | 492 | 0 | + | | 0 | — |
| 4 | 500 | 5250 | 100 | 0.87 | 435[1] | 0 | + | | 0 | — |
| 7 | 2500 | 7750 | 500 | 0.87 | 450[1] | 0 | + | | 0 | — |
| 9 | 3250 | 11000 | 433 | 1.30 | 695 | 0 | + | | 0 | — |
| 10 | 3650 | 14650 | 398 | 1.90 | 580 | 0 | + | | 0 | — |
| 14 | 3600 | 18250 | 197 | 3.16 | 695 | 0 | + | | 0 | — |
| 16 | 3000 | 21250 | 120 | 4.35 | 753 | 29.0 | + | | 0 | — |
| 16 | 3000 | 24250 | 115 | 4.50 | 638 | 58.3 | + | | 11.5 | — |

[1]Estimated
[2]The + sign denotes the presence of CO-PCN or dissolved prior art catalyst. The — sign denotes no metal complex was detectable. No loss or solubilization of CO-TPPA was detectable.
[3]The abbreviations CO-TPPA denotes cobalt tetrapyridinoporphyrazine; CO-PCN, cobalt phthalocyanine; RSH, 1-butanethiol.

In addition to the leaching of th prior art catalyst from its support, it should be noted that on day 16 the activity of the prior art catalyst has begun to decline.

We claim:

1. A catalyst for oxidizing alkali mercaptide compounds to disulfide in an aqueous alkaline solution comprising: a caustic-inert carrier having impregnated thereon a metal compound of tetrapyridinoporphyrazine or substituted derivatives thereof having the structural formula:

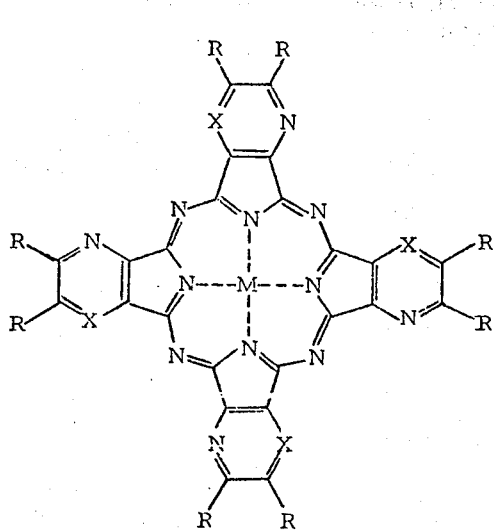

where M is a metal selected from the group consisting of iron, manganese, chromium, magnesium, copper, nickel, zinc, titanium, hafnium, thorium, tin, lead, columbium, tantalum, antimony, bismuth, molybdenum, palladium, platinum, silver, mercury, vanadium and cobalt, R is selected from the group consisting of hydrogen, methyl, ethyl, propyl, iso-butyl, phenyl, benzyl and napthyl groups, and X is a nitrogen atom, or a carbon atom having one R group attached thereto.

2. The catalyst of claim 1 wherein the caustic-inert carrier is granular activated carbon.

3. A catalyst for oxidizing alkali mercaptide compounds to disulfides in an aqueous solution, said catalyst comprising a caustic-inert carrier having impregnated thereon a metal-tetrapyridinoporphyrazine compound having the structural formula:

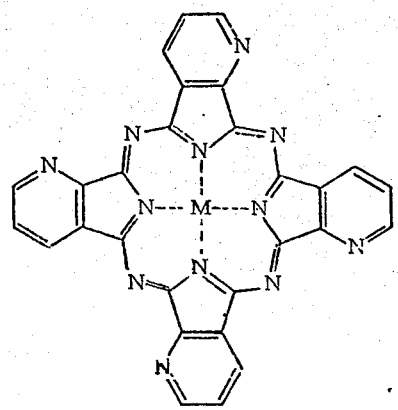

where M is a metal selected from the group consisting of cobalt and vanadium.

4. The catalyst of claim 3 wherein the caustic-inert carrier is granular activated carbon.

5. The catalyst of claim 3 wherein M is cobalt and the caustic-inert carrier is granular activated carbon.

6. The catalyst of claim 3 wherein M is vanadium and the caustic-inert carrier is granular activated carbon.

7. The catalyst of claim 3 wherein the caustic-inert carrier is granular activated carbon and the compound impregnated thereon is a mixture of cobalt and vanadium compounds of tetrapyridinoporphyrazine.

8. The catalyst of claim 3 wherein the concentration of metaltetrapyridinoporphyrazine compound in said catalyst is at least 0.5 percent by weight.

9. A method for preparing a catalyst for oxidizing alkali mercaptide compounds in aqueous alkaline solution to disulfide comprising:
   a. dissolving a metal compound selected from the group consisting of cobalt and vanadium tetrapyridinoporphyrazine compounds, and mixtures thereof, in a solvent;
   b. adding a granular adsorbent solid carrier to the solution resulting from (a) and saturating said solid carrier with said solution;
   c. separating said solid carrier from said solution and;
   d. washing said separated solid of (c) with a liquid selected from the group consisting of water, acetone, and mixtures thereof.

10. The method of claim 9 wherein said granular solid carrier is selected from the group consisting of silica, alumina, and activated carbon.

11. The method of claim 9 wherein said solid carrier is granular activated carbon.

12. The method of claim 9 wherein said solvent is selected from the group consisting of sulfuric acid, hydrochloric acid, phosphoric acid, N,N-dimethyl formamide, N-methyl-2-pyrrolidone, and pyridine.

13. The method of claim 9 wherein said metal compound is cobalt tetrapyridinoporphyrazine having the structural formula:

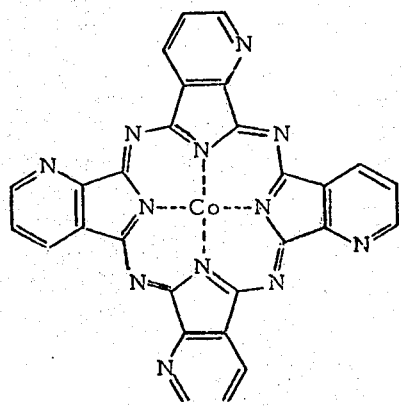

14. The method of claim 13 wherein said solvent is an aqueous solution of sulfuric acid in a concentration of between about 50 and about 96 weight percent of acid.

15. The method of claim 9 where said metal compound is vanadium tetrapyridinoporphyrazine having the structural formula:

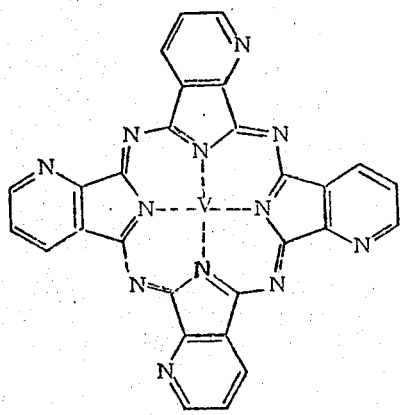

16. The method of claim 15 wherein said mineral acid is an aqueous solution of sulfuric acid in a concentration of between about 50 and about 96 weight percent acid.

* * * * *